United States Patent [19]
Kern

[11] Patent Number: 6,062,806
[45] Date of Patent: May 16, 2000

[54] SKID

[76] Inventor: James C. Kern, 725 N. Knightstown Rd., Shelbyville, Ind. 46176

[21] Appl. No.: 09/178,145

[22] Filed: Oct. 23, 1998

Related U.S. Application Data

[60] Provisional application No. 60/063,514, Oct. 27, 1997.

[51] Int. Cl.[7] .................................................. B65G 67/24
[52] U.S. Cl. ...................... 414/572; 414/376; 414/469; 414/498; 414/809; 414/812
[58] Field of Search ..................... 414/572, 498, 414/809, 373, 376, 469, 812; 108/57.12

[56] References Cited

U.S. PATENT DOCUMENTS

| | | | |
|---|---|---|---|
| 3,865,262 | 2/1975 | Smith, Jr. ........................... | 414/812 X |
| 4,114,941 | 9/1978 | Heaton .................................. | 294/86 R |
| 5,039,036 | 8/1991 | Rogers ................................ | 244/138 R |
| 5,380,141 | 1/1995 | Flowers ............................... | 414/812 X |
| 5,597,282 | 1/1997 | Hoffman et al. ..................... | 414/812 X |

*Primary Examiner*—Steven A. Bratlie
*Attorney, Agent, or Firm*—Barnes & Thornburg

[57] ABSTRACT

A skid for use in unloading palletized cargo from a vehicle having a bed comprises a rail for placement under the cargo and a stop projecting upwardly from the rail. The stop is placed adjacent a side of the cargo when the rail is positioned under the cargo. Movement of the bed with the skid in place causes the cargo and skid to slide from the bed to a surface onto which the cargo is to be deposited with the cargo riding on the skid.

20 Claims, 1 Drawing Sheet

U.S. Patent        May 16, 2000        6,062,806
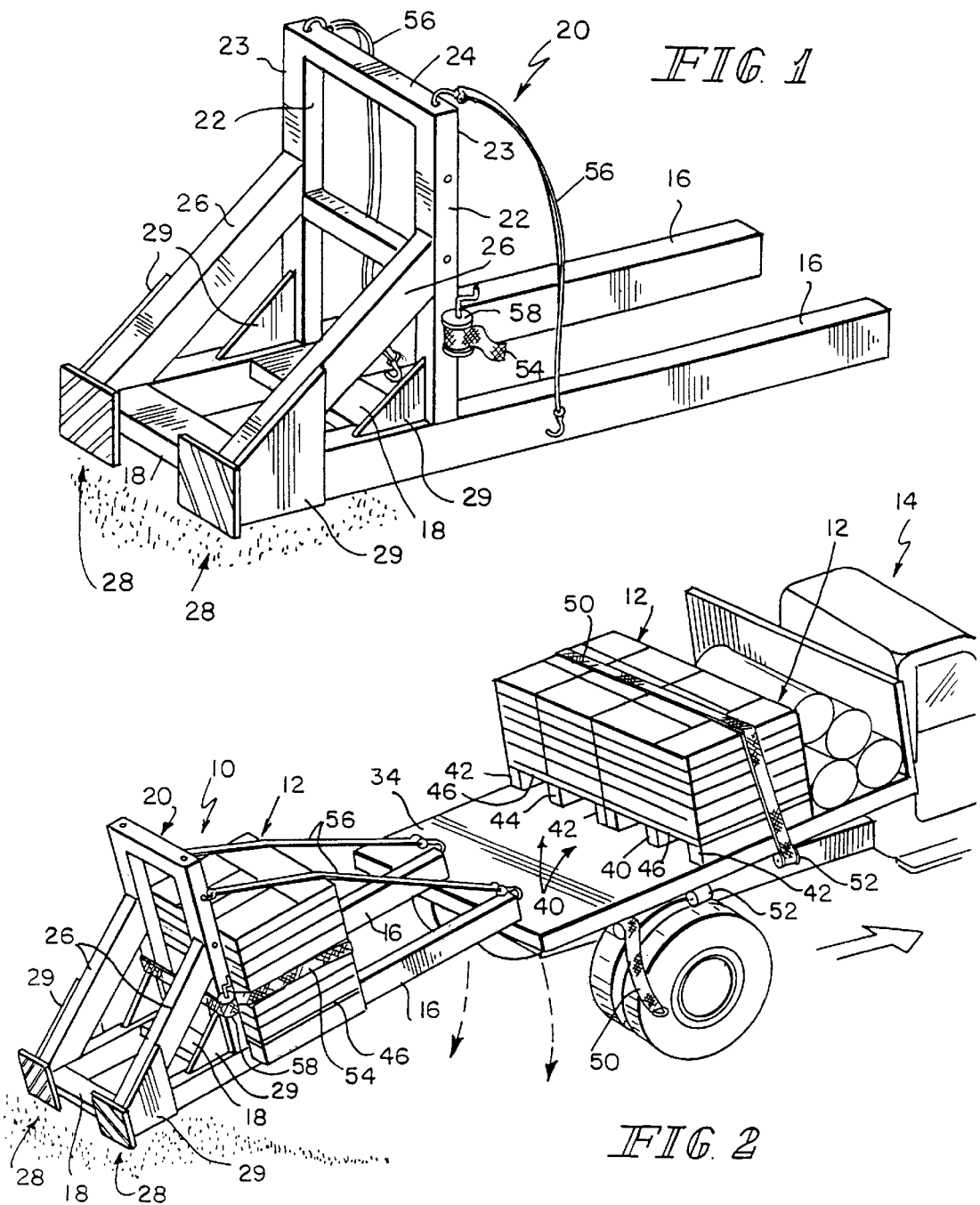

SKID

This application claims benefit of Provisional Application Ser. No. 60/063,514 filed Oct. 27, 1997.

FIELD OF THE INVENTION

This invention relates to material handling. More particularly, this invention relates to a skid for use in unloading a palletized cargo from a delivery vehicle.

BACKGROUND OF THE INVENTION

The use of shipping pallets is well known in the transportation of, for example, building materials such as shingles, siding and the like. When a pallet of such material is delivered to a customer at, for example, a building site, it is necessary to get the material off the delivery vehicle, typically a truck, and place it at a location convenient for the builder to remove the building material as needed during the construction. In the past, the building material supplier has sent two workmen to many such building sites and has scheduled as much as 1–2 hours for the workmen to unload a truckload of building materials. Often the palletized building materials have to be hand-unloaded from the truck because there is no other way for the two workmen to get the pallets or the building materials delivered on the pallets down from the bed of the truck. This is quite time consuming. In other cases, the workmen have used a forklift truck available at the construction site to assist in the unloading of the palletized building materials. In other cases, building material suppliers have resorted to purchasing specially built forklift trucks which can be carried on the backs of the delivery trucks for use by the workmen in unloading the delivery trucks. This, of course, is a rather expensive solution to the problem with which this invention deals.

DISCLOSURE OF THE INVENTION

According to one aspect of the present invention, a skid for use in unloading palletized cargo from a vehicle having a bed comprises a rail for placement under the cargo and a stop projecting upwardly from the rail. The stop is placed adjacent a side of the cargo when the rail is positioned under the cargo. Movement of the bed with the skid in place causes the cargo and skid to slide from the bed to a surface onto which the cargo is to be deposited with the cargo riding on the skid.

According to another aspect of the invention, a method is provided for unloading palletized cargo from a vehicle having a bed. The method comprises first placing a skid comprising a rail and a stop projecting upwardly from the rail under the cargo, then placing the stop adjacent a side of the cargo, and then moving the bed with the skid in place to cause the cargo and skid to slide from the bed to a surface onto which the cargo is to be deposited with the cargo riding on the skid.

Additional features and advantages of the invention will become apparent to those skilled in the art upon consideration of the following detailed description of an illustrative embodiment of the invention exemplifying the best mode of carrying out the invention as presently perceived.

BRIEF DESCRIPTION OF THE DRAWINGS

The invention can best be understood by referring to the following description and accompanying drawings which illustrate the invention. In the drawings:

FIG. 1 illustrates a perspective view of an apparatus constructed according to the present invention; and, FIG. 2 illustrates the apparatus of FIG. 1 in use on a delivery truck.

DETAILED DESCRIPTION OF AN ILLUSTRATIVE EMBODIMENT

Referring now to the drawings, a skid 10 for use in unloading palletized cargoes 12 from delivery vehicles 14 includes two parallel skid rails 16 joined together by two cross members 18 and supporting a backstop 20. The cross members illustratively are about 16" (about 41 cm) long. The backstop 20 is constructed as a frame which projects upwardly from the rails 16 and includes a pair of uprights 22, one of which is mounted to each of the rails 16. Uprights 22 illustratively are about 34" (about 86 cm) long. The vertically upper ends 23 and vertical centers of the uprights 22 themselves are joined by cross members 24, 25, respectively.

In the illustrated embodiment, added strength is provided by two 45 degree angled reinforcing members 26 extending upward from adjacent an end 28 of the rails 16 along the lengths of the uprights 22. Members 26 illustratively are about 34" (about 86 cm) long. In a typical configuration, frame members 18, 22, 24, 25, 26 are constructed from 2"×1"×⅛" wall thickness (about 2.5 cm×1.3 cm×3.2 mm wall thickness), generally rectangular cross section steel tube. Frame members 16 are constructed from 1 ½"×2 ½"×¼" wall thickness (about 3.8 cm×6.4 cm×6.4 mm wall thickness), generally rectangular cross section steel tube. A steel plate having dimensions of, for example, 3"×3"×¼" thickness (about 7.6 cm×7.6 cm×6.4 mm thickness) may be attached to each of ends 28 to increase the antiskid or antislip characteristics of the skid 10 when it reaches the surface onto which it is being deposited from the truck 14.

Steel plate fillets 29 can be provided if necessary to enhance the strength of the skid 10. The open, or "frame," construction is employed to keep the weight of the skid 10 somewhat more manageable by a workman than, for example, overall steel plate construction. The illustrated embodiment, constructed as described with 6' (about 1.8 m) long rails 16, weighs about 80 pounds (about 36 kg).

Dump bed-type trucks 14 are frequently used in making deliveries of building materials 12 by many building material suppliers. The beds 34 of such trucks 14 generally range in height, when in their untilted orientations, in the range of four feet or so. The range of heights of the back edges 36 of such beds 34 when fully tilted range from about 16" (about 40.6 cm) or so to about 25" (about 63.5 cm) or so. These figures can be used to calculate desirable ranges for the lengths of rails 16. The invention is also useful with non-tilting bed type delivery vehicles. In such deliveries, the skid 10 can be attached to a stationary object, such as a building frame or post firmly set in the ground, by, for example, a rope, chain or the like, and slowly pulled from the delivery vehicle 14, either by slowly driving the delivery vehicle or by the use of, for example, a block and tackle.

Typical pallets 40 range in dimensions from about 3' (about 0.9 m) to about 3-½' (about 1.1 m) square or approximately square. Pallets 40 typically have two, generally parallel edge stringers 42, or feet, and either one center stringer 44 or two stringers 44 between the two edge stringers 42, spaced equidistantly from the two edge stringers 42 and extending generally parallel with the edge stringers 42. Deck boards tie all of the stringers 42, 44 to one another and provide a surface or deck 46 upon which the palletized cargo 12 rests. These considerations make a skid rail 16 spacing of 16" (about 40.6 cm) or so useful. This rail 16 spacing permits the skid 10 of the present invention to be used on either the three-stringer or four-stringer pallets 40. A backstop 20 height in the range of three feet or so is adequate to handle most building material 12 deliveries, as building material suppliers typically do not stack building materials 12 on pallets 40 to heights much exceeding this height.

The building materials 12 are typically shipped on the truck bed 34 by palletizing the building materials 12, and securing them to the truck bed 34 using, for example, webbing straps or cables 50 and a "come-along" or strap winch 52 to tighten the lashing 50 over the palletized building material 12 to reduce the likelihood of shifting of the building materials 12 during transportation. At a site where one or more pallets 40 of building materials 12 are to be delivered, the lashing(s) 50 of that (those) pallet(s) 40 which is (are) next to be unloaded from the truck bed 34 is (are) released, and the skid rails 16 are inserted under that (those) pallet(s) 40 between stringers 42, 44 of the pallet(s) 40 until the building material 12 stacked on the pallet(s) 40 to be unloaded is against the backstop(s) 20.

Lashing 54 and/or elastic "bungee" cord 56, either with or without interior coil springs and end hooks, is then used to attach the stacked building material 12 on the pallet 40 to the uprights 22 for delivery. The lashing 54 is tightened, again using, for example, a come-along or strap winch 58. Then the dump bed 34 is tilted back and the skid 10 and its attached pallet 40 of building material 12 slide from the back end 36 of the dump bed 34. When the back ends 28 of the skid rails 16 rest on the ground, the truck 14 is slowly pulled forward until the skid 10 is completely clear of the dump bed 34 and the pallet 40 rests on the ground. The lashing 54/cord 56 around the just-delivered palletized building material 12 is then released, and the skid 10 is returned to the truck 14 to deliver another palletload of building material 12, either at the same or another location.

Although the invention has been described in detail with reference to an illustrative embodiment, variations and modifications exist within the scope and spirit of the invention as described and defined in the following claims.

What is claimed is:

1. A skid for use in unloading palletized cargo from a vehicle having a bed comprising a rail for placement under the cargo and a stop projecting upwardly from the rail for placement adjacent a side of the cargo when the rail is positioned under the cargo, movement of the bed with the skid in place causing the cargo and skid to slide from the bed to a surface onto which the cargo is to be deposited with the cargo riding on the skid.

2. The skid of claim 1, further comprising means for securing the cargo to the skid.

3. The skid of claim 2, wherein the securing means includes a lashing coupled to the stop and configured to extend around the cargo to hold the cargo adjacent the stop.

4. The skid of claim 2, wherein the securing means includes an elastic cord extending between the stop and the rail to bias the cargo toward the stop and the rail.

5. The skid of claim 1, further comprising a reinforcing member extending between the rail and the stop.

6. The skid of claim 5, further comprising a fillet extending between the reinforcing member and the rail.

7. The skid of claim 1, further comprising a foot positioned adjacent an end of the rail which first contacts the surface, the foot configured to reduce the likelihood of movement of the skid along the surface when the vehicle is moved with the foot in contact with the surface.

8. The skid of claim 7, wherein the foot is the first portion of the skid to contact the surface as the cargo and skid slide from the bed.

9. A method for unloading palletized cargo from a vehicle having a bed, the method comprising placing a skid comprising a rail under the cargo, providing a stop projecting upwardly from the rail for placement adjacent a side of the cargo when the rail is positioned under the cargo, and moving the bed with the skid in place to cause the cargo and skid to slide from the bed to a surface onto which the cargo is to be deposited with the cargo riding on the skid.

10. The method of claim 9 further comprising securing the cargo to the skid.

11. The method of claim 10 wherein the step of securing the cargo to the skid comprises the step of providing a lashing coupled to the stop and configured to extend around the cargo to hold the cargo adjacent the stop.

12. The method of claim 10 wherein the step of securing the cargo to the skid comprises the step of providing an elastic cord extending between the stop and the rail to urge the cargo toward the stop and the rail.

13. The method of claim 9 further comprising providing a reinforcing member extending between the rail and the stop.

14. The method of claim 13 further comprising providing a fillet extending between the reinforcing member and the rail.

15. The method of claim 9 further comprising providing a foot positioned adjacent an end of the rail which first contacts the surface, the foot configured to reduce the likelihood of movement of the skid along the surface when the bed is moved with the foot in contact with the surface.

16. The method of claim 15 further comprising first contacting the surface with the foot as the cargo and skid slide from the bed.

17. A skid for use in unloading a palletized cargo from a delivery vehicle comprising two skid rails for placement under the cargo, the rails extending generally parallel to each other, at least one cross member connecting the rails, a stop projecting from the rails and adapted to position adjacent the cargo, and means to secure the cargo to at least one of the stop and the rails to allow the skid and cargo to slide off the delivery vehicle together.

18. The skid of claim 17, further comprising a reinforcing member extending between at least one of the rails and the backstop.

19. The skid of claim 18, wherein the skid includes two reinforcing members, one reinforcing member extending between each rail and the stop.

20. The skid of claim 18, wherein the reinforcing member extends upward at an angle of about 45 degrees from the rail.

* * * * *